United States Patent [19]

Sarangdhar et al.

[11] Patent Number: 5,909,699
[45] Date of Patent: *Jun. 1, 1999

[54] METHOD AND APPARATUS FOR SUPPORTING READ, WRITE, AND INVALIDATION OPERATIONS TO MEMORY WHICH MAINTAIN CACHE CONSISTENCY

[75] Inventors: Nitin V. Sarangdhar; Michael W. Rhodehamel, both of Beaverton, Oreg.; Amit A. Merchant, Citrus Heights, Calif.; Matthew A. Fisch; James M. Brayton, both of Beaverton, Oreg.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/672,422

[22] Filed: Jun. 28, 1996

Related U.S. Application Data

[63] Continuation of application No. 08/202,790, Feb. 28, 1994, Pat. No. 5,572,702.

[51] Int. Cl.$^6$ .................................................. G06F 13/14
[52] U.S. Cl. ............................................. 711/146; 711/155
[58] Field of Search ............................... 395/800.01, 840, 395/842, 857, 287, 670, 500; 711/140–146, 154, 169, 155; 364/131–134

[56] References Cited

U.S. PATENT DOCUMENTS

| | | | |
|---|---|---|---|
| 4,959,777 | 9/1990 | Holman, Jr. ............................. | 711/141 |
| 5,072,369 | 12/1991 | Theus et al. ............................ | 711/146 |
| 5,119,485 | 6/1992 | Ledbetter, Jr. et al. ................ | 711/146 |
| 5,341,487 | 8/1994 | Derwin et al. .......................... | 711/146 |
| 5,345,578 | 9/1994 | Manasse .................................. | 711/146 |
| 5,386,511 | 1/1995 | Morata et al. .......................... | 711/120 |
| 5,420,991 | 5/1995 | Konigsfeld et al. .................... | 711/150 |

OTHER PUBLICATIONS

"Pentium Processor User's Manual: vol. 1: Pentium Processor Data Book," Intel Corporation, 1993, pp. 6–34 through 6–45.

"The Metaflow Architecture," Val Popescu, et al., IEEE Micro, Jun. 1991, pp. 10–13 and 63–73.

*Primary Examiner*—Larry D. Donaghue
*Attorney, Agent, or Firm*—Seth Kalson

[57] ABSTRACT

Requests to memory issued by an agent on a bus are satisfied while maintaining cache consistency. The requesting agent may issue a request to another agent, or the memory unit, by placing the request on the bus. Each agent on the bus snoops the bus to determine whether the issued request can be satisfied by accessing its cache. An agent which can satisfy the request using its cache, i.e., the snooping agent, issues a signal to the requesting agent indicating so. The snooping agent places the cache line which corresponds to the request onto the bus, which is retrieved by the requesting agent. In the event of a read request, the memory unit also retrieves the cache line data from the bus and stores the cache line in main memory. In the event of a write request, the requesting agent transfers write data over the bus along with the request. This write data is retrieved by both the memory unit, which temporarily stores the data, and the snooping agent. Subsequently, the snooping agent transfers the entire cache line over the bus. The memory unit retrieves this cache line, merges it with the write data previously stored, and writes the merged cache line to memory.

24 Claims, 9 Drawing Sheets

METHOD AND APPARATUS FOR SUPPORTING READ, WRITE, AND INVALIDATION OPERATIONS TO MEMORY WHICH MAINTAIN CACHE CONSISTENCY

This is a continuation of application Ser. No. 08/202,790, filed Feb. 28, 1994, now U.S. Pat. No. 5,572,702.

BACKGROUND OF THE INVENTION

1. Field of the Invention

The present invention pertains to the field of computer system buses. More particularly, this invention relates to the field of maintaining cache consistency in a multi-agent computer system.

2. Background

The speed and performance of modern computer systems is ever-increasing. One aspect of these advancements is the increasing use of high-speed cache memories. In many modern computer systems, multiple agents may reside on a single bus, each of which may have its own, individual high-speed cache.

The implementations of these caches vary, however each generally attempts to operate efficiently with both the latest advances in microprocessor technology as well as other agents residing on the bus, such as I/O devices. For example, some agents on the bus may be capable of performing accesses which take advantage of the full size of a cache line, whereas other agents may only be capable of performing accesses which use a portion of a cache line. Thus, computer systems must efficiently manage writing to a portion of a cache line which has been modified within the cache of another agent, i.e., a partial write data transfer to a modified cache line, while at the same time efficiently managing other cache line requests.

Additionally, in computer systems with multiple caches, cache consistency must be maintained in order to ensure proper system behavior. Cache consistency refers to all caches agreeing on which cache(s), or memory, has the most recent version of any particular cache line. One method of maintaining cache consistency includes a modified dirty (altered) bit associated with each cache line. This bit indicates whether the data contained in the cache is more recent than the data in main memory.

When a new memory transaction over the bus begins, all memory and caching agents participate in order to complete the transaction and maintain cache consistency. By maintaining cache consistency, all agents know whether their copy of the data is dirty, clean, or invalid.

One solution to the cache consistency problem utilizes a three-transaction, or three-phase, solution. For example, in a partial memory write data transaction to a writeback memory space, the agent making the request to memory issues the request in the first phase. Another agent on the bus, the snooping agent, which has a modified copy of the cache line corresponding to the request asserts a signal indicating this. In response to this signal, the memory unit, such as a memory controller connected to a main memory, issues a back-off signal. The requesting agent receives this back-off signal and knows it must wait to reinitiate the write request.

In phase two, the snooping agent knows from phase one that another agent desires access to the modified cache line, so the snooping agent issues a write operation of the cache line to the memory unit. Thus, main memory is updated with the most recent version of the cache line. In phase three, the memory unit releases the back-off signal to the requesting processor and the requesting processor is allowed to re-try the request. When the request is re-tried, the most recent version is in main memory and the request is successful (assuming no other agent has modified the cache line in its cache in the meantime).

While this three-phase solution is effective, it is not efficient in a pipelined environment due to the requirement of three transactions to successfully complete the request. Therefore, it would be advantageous to provide a mechanism that maintains cache consistency, while at the same time efficiently performing memory transactions to modified cache lines. The present invention provides such a solution.

In modern computer systems, the importance of system speed is ever-increasing. Thus, while this three-phase solution is effective, it is not efficient in a pipelined environment due to the requirement of three transactions to successfully complete the request. Therefore, it would be advantageous to provide a mechanism that maintains cache consistency, while at the same time efficiently performs memory transactions to modified cache lines. The present invention provides such a solution.

Furthermore, as microprocessors become smaller and smaller, efficient use of a limited amount of space is becoming increasingly important. Thus, it would be advantageous to provide a system which maintains cache consistency while employing a minimal amount of logic complexity.

Additionally, many modern computer systems utilize multiple processing agents, each of which may have its own cache. The number of processing agents, as well as the existence of multiple processing agents, varies. Thus, it would be advantageous to provide a versatile system which supports the insertion of multiple processors with a minimal amount of additional logic and expense. The present invention provides such a solution.

SUMMARY AND OBJECTS OF THE INVENTION

A method and apparatus for supporting read, write, and invalidation operations to memory which maintain cache consistency are described herein. Multiple caching agents and a memory unit are coupled to a bus. One agent may issue a request to another agent, or the memory unit, by placing the request on the bus. Each agent on the bus snoops the bus to determine whether the issued request can be satisfied by accessing its cache. If no cache intervention is necessary, the operation is completed between the memory controller and the caching agent. Otherwise, an agent which can satisfy the request using its cache, i.e., the snooping agent, issues a signal to the requesting agent indicating so. The snooping agent then places the cache line which corresponds to the request onto the bus during the response phase. The requesting agent retrieves this data from the bus, if needed, and proceeds to use it. The memory agent in this case becomes a participant instead of the main responding agent.

In the event of a read request, the memory unit also retrieves the cache line data from the bus. The memory unit stores the cache line in main memory, thereby updating the cache line in main memory.

In the event of a write request, the requesting agent transfers write data over the bus along with the request. This write data is retrieved by the memory unit, which temporarily stores the data. Subsequently, the snooping agent transfers the entire cache line over the bus; the memory unit retrieves this cache line, merges it with the write data previously stored, and writes the merged cache line to memory.

In a pipelined bus architecture, multiple read, write and other memory operations are carried out. One aspect of cache consistency management is an accurate method of snoop ownership dropoff and pickup boundaries. That is, the bus agents accurately indicate to other agents whether requests can be satisfied by accessing their respective caches. The bus agents participating in a memory transaction complete their snoop state transitions prior to the snoop phase of the subsequent transaction, thereby providing accurate snooping for the subsequent transaction.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for supporting read, write, and invalidation operations to memory which maintain cache consistency are described in detail. In the following description for purposes of explanation, specific details such as processor configurations, components, bus hierarchies, etc., are set forth in order to provide a thorough understanding of the present invention. However, it will be comprehended one skilled in the art that the present invention may be practiced without these specific details. In other instances, well known structures, devices, functions, and procedures are shown in block diagram form in order not to obscure the present invention. It should be noted that the present invention can be applied to a variety of different processor architectures. Furthermore, the present invention can be practiced in a variety of manners, such as by a single or multiple chip implementation or by fabrication by silicon, gallium arsenide, or other processes.

Figure 1A:
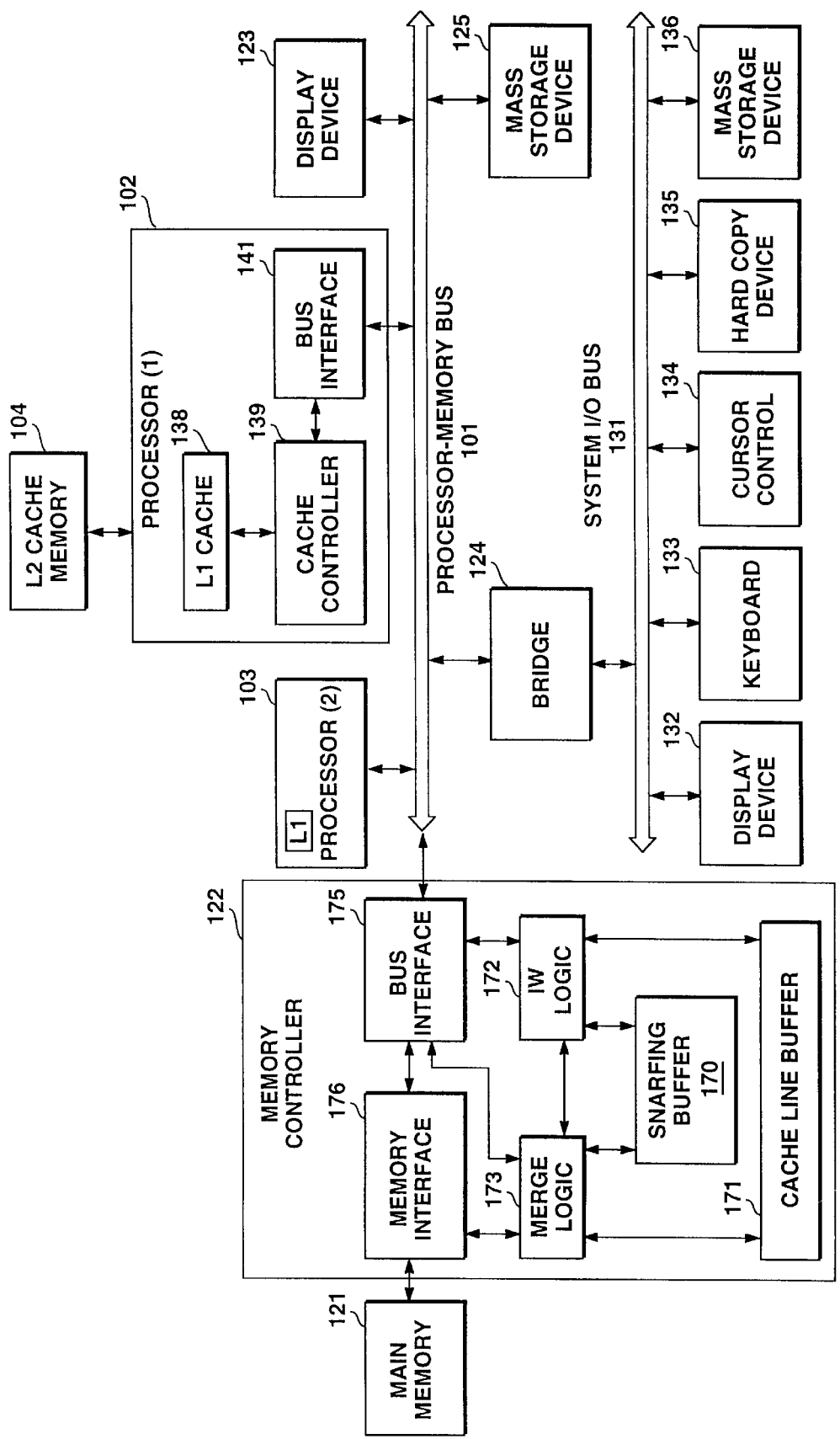
FIG. 1A shows an overview of a multiprocessor computer system of the present invention.

FIG. 1A shows an overview of an example multiprocessor computer system of the present invention. The computer system generally comprises a processor-memory bus or other communication means 101 for communicating information between one or more processors 102 and 103. Processor-system bus 101 includes address, data and control buses. Processors 102 and 103 may include a small, extremely fast internal cache memory, commonly referred to as a level one (L1) cache memory for temporarily storing data and instructions on-chip. In addition, a bigger, slower level two (L2) cache memory 104 can be coupled to processor 102 for temporarily storing data and instructions for use by processor 102. In one embodiment, processors 102 and 103 are Intel® architecture compatible microprocessors; however, the present invention may utilize any type of microprocessor, including different types of processors.

Also coupled to processor-memory bus 101 is processor 103 for processing information in conjunction with processor 102. Processor 103 may comprise a parallel processor, such as a processor similar to or the same as processor 102. Alternatively, processor 103 may comprise a co-processor, such as a digital signal processor. The processor-memory bus 101 provides system access to the memory and input/output (I/O) subsystems. A memory controller 122 is coupled with processor-memory bus 101 for controlling access to a random access memory (RAM) or other dynamic storage device 121 (commonly referred to as a main memory) for storing information and instructions for processor 102 and processor 103. Memory controller 122 maintains a strong order of read and write operations. A mass data storage device 125, such as a magnetic disk and disk drive, for storing information and instructions, and a display device 123, such as a cathode ray tube (CRT), liquid crystal display (LCD), etc., for displaying information to the computer user are coupled to processor-memory bus 101.

In one embodiment memory controller 122 contains a snarfing buffer 170, cache line buffer 171, implicit writeback (IW) logic 172 and merge logic 173. Snarfing buffer 170 is a temporary data buffer for storage of data "snarfed" off the bus. Cache line buffer 171 is a temporary data buffer used for storing Implicit Writeback Data Transfer data taken off the bus. In one embodiment, IW logic 172 stores data received from the bus into either snarfing buffer 170 or cache line buffer 171, depending on the source of the data. In an alternate embodiment, IW logic 172 transfers the data directly to main memory without storing the data in a temporary buffer. IW logic 172 may also issue an implicit writeback response onto the bus, depending on the request and whether memory controller 122 will be transferring data to satisfy the request. In one mode, IW logic 172 is coupled to the bus through a bus interface 175, which takes data off the bus and places data onto the bus.

Merge logic 173 merges the data in snarfing buffer 170 and cache line buffer 171 together, then stores the cache line in main memory 121. In one mode, merge logic 173 stores the cache line in main memory 121 via a memory interface 176. In one embodiment, snarfing buffer 170 and cache line buffer 171 represent multiple buffers. That is, memory controller 122 contains multiple snarfing buffers and multiple cache line buffers. Additional buffers have not been shown so as not to clutter the drawings.

Memory controller 122's use of snarfing buffer 170, cache line buffer 171, IW logic 172, and merge logic 173 in the present invention is discussed in more detail below. The transferring of data between memory controller 122 and the bus and between memory controller 122 and main memory 121 will be understood by one skilled in the art, and thus will not be described further.

In an alternate embodiment, snarfing buffer 170, cache line buffer 171, IW logic 172, and merge logic 173 are included in other agent(s) on the bus. For example, processors 102 or 103 of FIG. 1A, or agents 153 through 156 or cluster manager 157 of FIG. 1B, may include this additional logic, snarfing data off the bus and merging it to store in the agent's internal memory. In one mode, processors 102 and 103 include a temporary storage buffer for storing the merged data line; thus, a subsequent request for the same data line can be satisfied directly from the temporary storage buffer rather than memory. In another mode, agents store the merged cache line in an L2 cache memory, such as L2 cache memory 104 of FIG. 1A.

In one embodiment, processor 102 also includes a L1 cache memory 138 coupled to a cache controller 139. In one mode, cache controller 139 asserts signals on processor-memory bus 101 and receives signals on bus 101 through bus interface 141. Cache controller 139 checks requests on bus 101 to determine whether cache memory 138 contains a copy of the requested cache line by checking the state of the cache line as described below. Cache controller 139 may assert a HIT# signal or a HITM# signal, depending on the state of the cache line, as discussed below. In one mode, cache controller 139 transfers the cache line in cache memory 138 to bus 101 when it asserts a HITM# signal in response to the request. In one embodiment, cache controller 139 places the cache line onto processor-memory bus 101 through bus interface 141. The issuing of signals and transferring of data to and from bus 101 by cache controller 139 will be understood by one skilled in the art, and thus will not be described further.

In an alternate embodiment, cache controller 139 also controls a L2 cache memory 104 coupled to processor 102. The interaction between cache controller 139 and cache memory 104 is as described above between cache memory 138 and cache controller 139.

Processor 102 as shown includes additional detail. The remaining agents on processor-memory bus 101, as well as those agents in cluster 151 and 152 of FIG. 1B, may also include the additional logic shown in processor 102. In one embodiment, all agents on the bus which issue requests include cache memory 138 and cache controller 139. This additional logic has not been shown in all agents so as not to clutter the drawings.

An input/output (I/O) bridge 124 is coupled to processor-memory bus 101 and system I/O bus 131 to provide a communication path or gateway for devices on either processor-memory bus 101 or I/O bus 131 to access or transfer data between devices on the other bus. Essentially, bridge 124 is an interface between the system I/O bus 131 and the processor-memory bus 101.

I/O bus 131 communicates information between peripheral devices in the computer system. Devices that may be coupled to system bus 131 include a display device 132, such as a cathode ray tube, liquid crystal display, etc., an alphanumeric input device 133 including alphanumeric and other keys, etc., for communicating information and command selections to other devices in the computer system (e.g., processor 102) and a cursor control device 134 for controlling cursor movement. Moreover, a hard copy device 135, such as a plotter or printer, for providing a visual representation of the computer images and a mass storage device 136, such as a magnetic disk and disk drive, for storing information and instructions may also be coupled to system bus 131.

In some implementations, it may not be required to provide a display device for displaying information. Certain implementations of the present invention may include additional processors or other components. Additionally, certain implementations of the present invention may not require nor include all of the above components. For example, processor 103, display device 123, or mass storage device 125 may not be coupled to processor-memory bus 101. Furthermore, the peripheral devices shown coupled to system I/O bus 131 may be coupled to processor-memory bus 101; in addition, in some implementations only a single bus may exist with the processors 102 and 103, memory controller 122, and peripheral devices 132 through 136 coupled to the single bus.

Figure 1B:
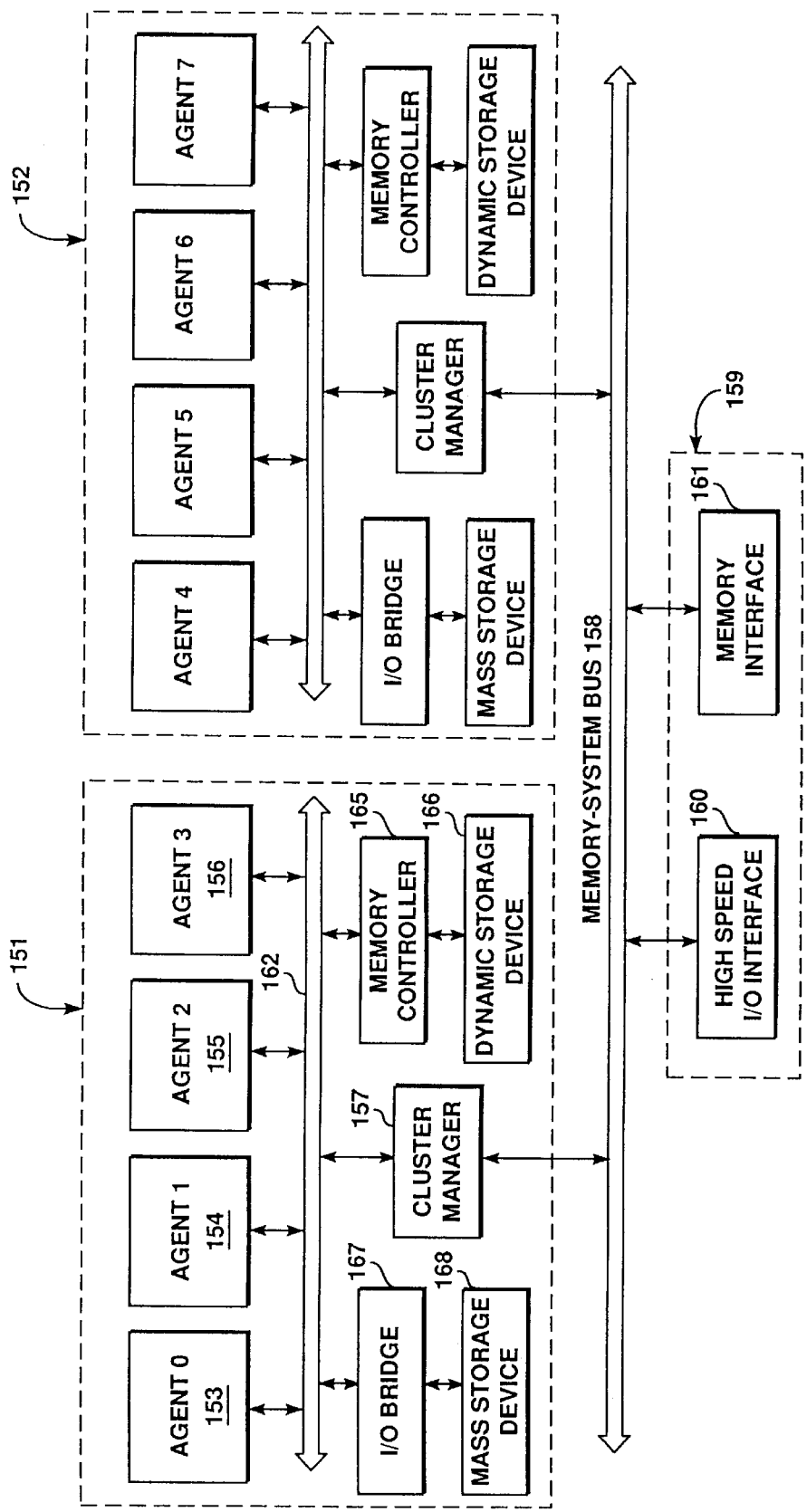
FIG. 1B shows a block diagram of an exemplary bus cluster system of the present invention.

FIG. 1B is a block diagram showing an exemplary bus cluster system of the present invention. The present invention can apply to multiprocessor computer systems having one or more clusters of processors. FIG. 1B shows two such clusters 151 and 152. Each of these clusters are comprised of a number of processors. For example, cluster 151 is comprised of four agents 153, 154, 155 and 156 and a cluster manager 157, which includes another cache memory. Agents 153 through 156 can include microprocessors, co-processors, digital signal processors, etc.; in one embodiment, agents 153 through 156 are identical to processor 102 of FIG. 1A. Cluster manager 157 and its cache is shared between these four agents 153 through 156.

In one embodiment, each cluster also includes a local memory controller and/or a local I/O bridge. For example, cluster 151 may include a local memory controller 165 coupled to processor bus 162. Local memory controller 165 manages accesses to a RAM or other dynamic storage device 166 contained within cluster 151. Cluster 151 may also include a local I/O bridge 167 coupled to processor bus 162. Local I/O bridge 167 manages accesses to I/O devices within the cluster, such as a mass storage device 168, or to an I/O bus, such as system I/O bus 131 of FIG. 1A.

Each cluster is coupled to a memory system bus 158. These clusters 151 and 152 are coupled to various other components of the computer system through a system interface 159. The system interface 159 includes a high speed I/O interface 160 for interfacing the computer system to the outside world and a memory interface 161 which provides access to a main memory, such as a DRAM memory array (these interfaces are described in greater detail in FIG. 1A).

Certain implementations of the present invention may not require nor include all of the above components. For example, cluster 151 or 152 may comprise fewer than four agents. Additionally, certain implementations of the present invention may include additional processors or other components.

The computer system of the present invention utilizes a writeback configuration with the well-known M.E.S.I. (Modified, Exclusive, Shared, or Invalid) protocol. The caches have tags that include a bit called the modified dirty (altered) bit. This bit is set if a cache location has been updated with new information and therefore contains information that is more recent than the corresponding information in main system memory 121.

The M.E.S.I. protocol is implemented by assigning state bits for each cached line. These states are dependent upon both data transfer activities performed by the local processor as the bus master, and snooping activities performed in response to transactions generated by other bus masters. M.E.S.I. represents four states. They define whether a line is valid (i.e., hit or miss), if it is available in other caches (i.e., shared or exclusive), and if it is modified (i.e., has been modified). The four states are defined as follows:

[M]—MODIFIED This state indicates a line which is exclusively available in only this cache (all other caches are I), and is modified (i.e., main memory's copy is stale). A Modified line can be read or updated locally in the cache without acquiring the memory bus. Because a Modified line is the only up-to-date copy of data, it is the cache controller's responsibility to write-back this data to memory on snoop accesses to it.

[E]—EXCLUSIVE Indicates a line which is exclusively available in only this cache (all other caches are I), and that this line is not modified (main memory also has a valid copy). Writing to an Exclusive line causes it to change to the Modified state and can be done without informing other caches or memory. On a snoop to E state it is the responsibility of the main memory to provide the data.

[S]—SHARED Indicates that this line is potentially shared with other caches. The same line may exist in one or more other caches (main memory also has a valid copy).

[I]—INVALID Indicates that the line is not available in the cache. A read to this cache line will be a miss and cause the cache controller to execute a line fill (i.e., fetch the entire line and deposit it into the cache SRAM).

The states determine the actions of the cache controller with regard to activity related to a line, and the state of a line may change due to those actions. All transactions which may require state changes in other caches are broadcast on the shared memory bus.

In one embodiment, bus activity is hierarchically organized into operations, transactions, and phases. An operation is a bus procedure that appears atomic to software such as reading a naturally aligned memory location. Executing an operation usually requires one transaction but may require multiple transactions, such as in the case of deferred replies in which requests and replies are different transactions. A transaction is the set of bus activities related to a single request, from request bus arbitration through response-initiated data transfers on the data bus. In this embodiment, a transaction is the set of bus activities related to a single request, from request bus arbitration through response-initiated data transfers on the data bus.

A transaction contains up to six distinct phases. However, certain phases are optional based on the transaction and response type. A phase uses a particular signal group to communicate a particular type of information. These phases are:

Arbitration Phase
Request Phase
Error Phase
Snoop Phase
Response Phase
Data Transfer Phase In one mode, the Data Transfer Phase is optional and used if a transaction is transferring data. The data phase is request-initiated, if the data is available at the time of initiating the request (e.g., for a write transaction). The data phase is response-initiated, if the data is available at the time of generating the transaction response (e.g., for a read transaction). A transaction may contain both a request-initiated data transfer and a response-initiated data transfer.

Figure 2:
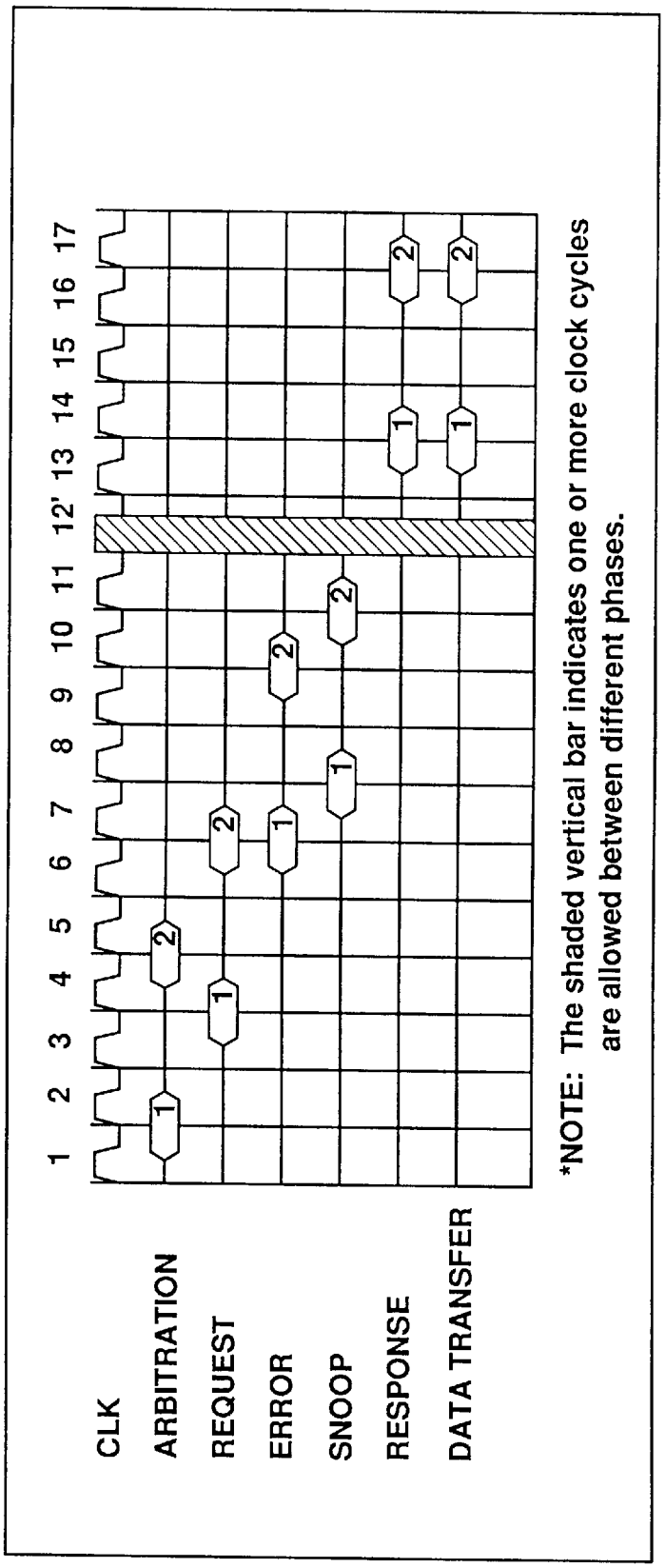
FIG. 2 is a timing diagram of two bus transactions in one embodiment of the present invention.

Different phases from different transactions can overlap, thereby pipelining bus usage and improving bus performance. FIG. 2 shows exemplary overlapped request/response phases for two transactions. Referring to FIG. 2, every transaction begins with an Arbitration Phase, in which a requesting agent becomes the bus owner. The second phase is the Request Phase in which the bus owner drives a request and address information on the bus. The third phase of a transaction is an Error Phase, three clocks after the Request Phase. The Error Phase indicates any immediate errors triggered by the request. The fourth phase of a transaction is a Snoop Phase, four or more clocks from the Request Phase. The Snoop Phase indicates if the cache line accessed in a transaction is valid or modified (dirty) in any agent's cache.

The Response Phase indicates whether the transaction failed or succeeded, whether the response is immediate or deferred, and whether the transaction includes data phases. If a transaction contains a response-initiated data phase, then it enters data transfer along with the response phase.

The use of a pipelined system can pose several problems. For example, in FIG. 2, request 1 is driven in clock T1 and request 2 is driven in clock T4. If request 1 and request 2 are both requests for the same address, the system must maintain cache consistency in order to properly execute both request 1 and request 2.

The determination of a global observation clock resolves this problem. That is, a clock cycle is determined at which the entire system is deemed to observe the transaction. In one embodiment, this global observation clock is at the Snoop Phase. Thus, before the Snoop Phase of a particular transaction, every agent in the system treats the transaction as never having taken place. This is so even though the requesting agent has driven a request onto the bus. However, after the Snoop Phase every agent treats the request as having taken place.

The global observation clock is at the Snoop Phase because every agent knows the fate of the transaction at the Snoop Phase. That is, whether an agent has a modified cache line corresponding to the request is known, and agents which must update the state of their own cache line know to do so. Thus, the agent(s) which are involved with the response to the requesting agent are known.

Note that under certain circumstances, a particular transaction may not be globally observed at the Snoop Phase for that transaction. For example, in systems employing a multiple-bus hierarchy, as shown in FIG. 1B, the current transaction is globally observed if the ownership of the requested cache line can be satisfied within the bus cluster of the processor issuing the request (regardless of whether it is in modified or shared state). However, the situation may arise where the cache line is not owned within the bus cluster and is either in a different cluster or system memory, which is reached via the cluster manager 157 of the current cluster. In such a case the cluster manager 157 is responsible for obtaining ownership of the cache line. Three different scenarios exist in such a case.

In the first scenario, the ownership of the next level system bus 158 is immediately available. Consequently, the ownership of the cache line can be guaranteed by the Snoop Phase of the current transaction. Thus, the transaction is globally observed at the Snoop Phase of the current transaction, as discussed above. In a second scenario, the ownership of the next level system bus 158 is not immediately possible, and yet, it can be obtained at a later time. Furthermore, the cache line can be returned back to the requesting processor. In this instance, the cluster manager 157 defers global observation of the transaction. When the next level system bus ownership is finally obtained, the cluster manager 157 returns the ownership of the cache line with a deferred reply. During the Snoop Phase of the deferred reply the transaction is globally observed. Finally, ownership of the next level system bus 158 might not be possible in order to avoid a deadlock. Hence, the transaction is aborted and retried one more time. The transaction is not globally observed until the retried transaction is successfully completed. The retried transaction is globally observed based on the case it falls under during retry.

The states of the corresponding cache lines are updated during the Snoop Phase in order to support the global observation clock. That is, to ensure proper system behavior the cache line states are updated at the global observation clock. For example, in FIG. 2, if request 1 and request 2 are both read requests to the same cache line, the cache line states which must be updated as a result of request 1 are updated prior to the Snoop Phase for request 2. Otherwise, the proper agent(s) may not assert the necessary HIT# or HITM# signals for request 2.

For example, the Snoop Phase for request 1 of FIG. 2 begins at clock 7. At clock 7, all agents on the bus assert or deassert HIT# and HITM# signals, depending on the state of the requested cache line in their caches. These signals are observed by all agents on the bus in the next clock, clock 8. In one embodiment, each agent on the bus updates its cache state in clock 7, along with asserting or deasserting HIT# and HITM# signals. Thus, by clock 8 each agent has updated its snoop state. In the example shown in FIG. 2, the Snoop Phase for request 2 begins at clock 10. Thus, since each agent's cache state is updated by clock 8, each agent asserts or deasserts the proper HIT# and HITM# signals in the Snoop Phase for request 2, even if request 2 is a request for the same cache line as request 1.

In an alternate embodiment, each agent updates its cache state in clock 8 or clock 9, upon observation of the snoop HIT# and/or HITM# signals in clock 8. In the example of FIG. 2, cache consistency is maintained when the cache states are updated prior to the Snoop Phase for request 2. Thus, updating cache states in clock 8 or clock 9 preserves cache consistency.

Figure 3:
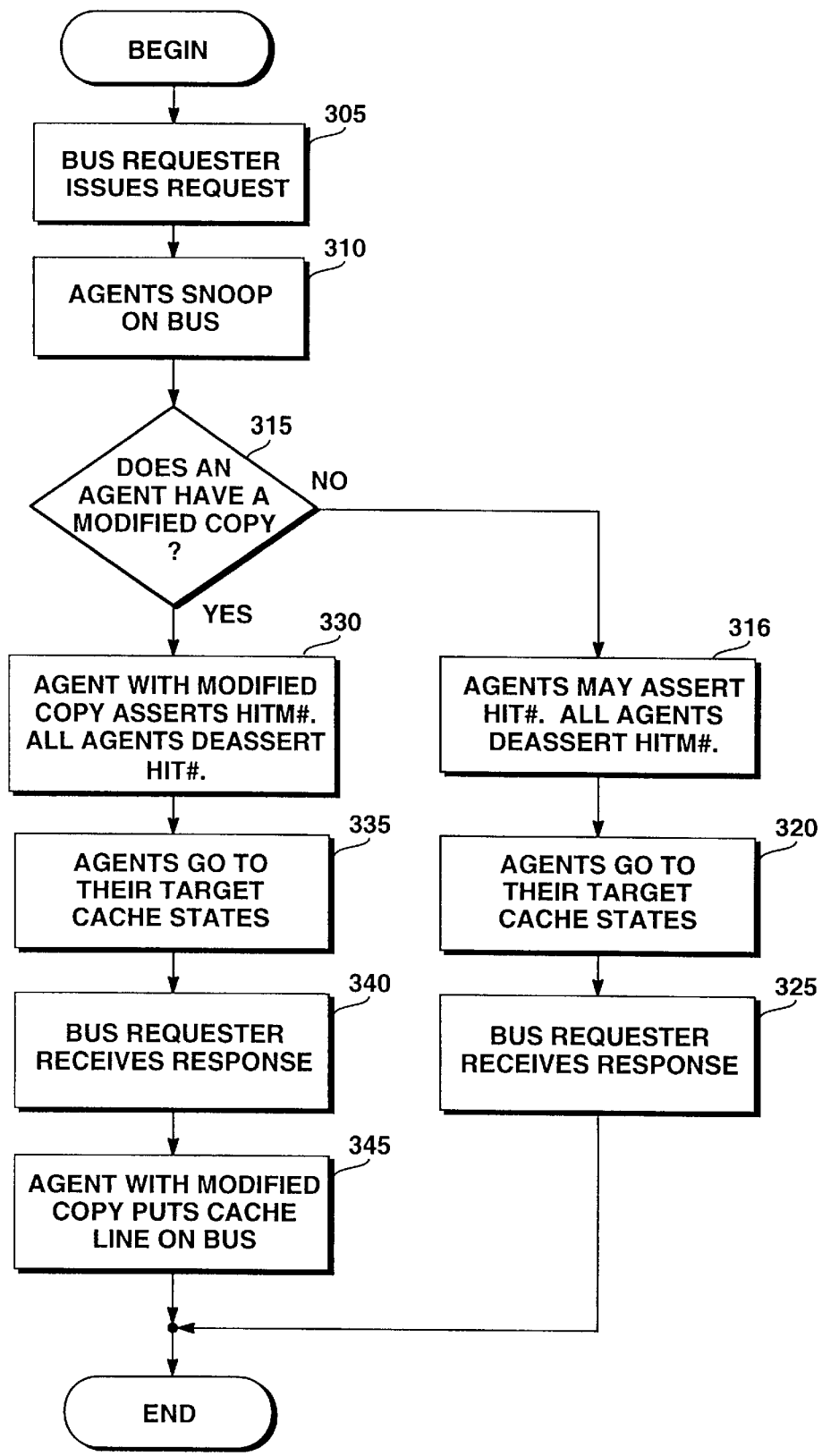
FIG. 3 is a flowchart describing the steps for supporting an operation to memory on a pipelined bus in one embodiment of the present invention.

FIG. 3 shows a flowchart describing the steps followed by one embodiment of the present invention. Initially, an agent on the processor-memory bus 101 of FIG. 1A, such as processor 102, issues a request on the bus 101, step 305, targeting another agent on bus 101, or perhaps a device on system I/O bus 131. The request is issued in the Request Phase, after processor 102 is awarded the bus during the Arbitration Phase. If no errors occur which require abortion of the request in the Error Phase, all agents on bus 101 do a snoop lookup in the Snoop Phase, step 310.

During the Snoop Phase, each agent performing a snoop lookup determines whether it has the cache line corresponding to the request in modified state, step 315. If no agent on the bus has a modified copy of the cache line, then each agent on bus 101 deasserts HITM# and either asserts or deasserts HIT#, step 316. In some situations, agents may keep their cache lines in shared state, depending on the nature of the request; these agents assert a HIT# signal. All other agents deassert a HIT# signal. Each agent on bus 101 then changes the state of its cache line to its target cache state, step 320. This target cache state is dependent on the nature of the request issued in step 305 and is discussed in more detail below. Processor 102 then receives a response from the target agent, memory controller 122, in the Response Phase, step 325. If necessary (e.g., a read request), processor 102 also receives data from the target agent in the Data Transfer Phase.

However, if an agent performing a snoop lookup, such as processor 103, does have a modified copy of the corresponding cache line, then processor 103 asserts a HITM# signal during the Snoop Phase, step 330. In addition, all other agents on bus 101, including processor 103, deassert a HIT# signal. Processor 103 deasserts HIT# because in normal operation in this embodiment a processor deasserts HIT# when it asserts HITM#. All other agents deassert HIT# because no other agent can have a valid copy of the cache line if processor 103 has a modified copy. All agents on the bus observe the HIT# and HITM# signals. The HITM# signal from processor 103 informs both processor 101 and memory controller 122 that processor 103 has the most recent version of the requested cache line, and that any access to that cache line should therefore involve the copy of the cache line contained in processor 103. The response by processor 102 and memory controller 122 to the HITM# signal is dependent on the nature of the request, as described in more detail below.

Next, each agent on bus 101 which must change the state of its cache line to its target cache state, step 335. This target cache state is dependent on the nature of the request issued in step 305 and is discussed in more detail below.

The requesting agent, processor 102, receives a response during the Response Phase, step 340. The content of this response is dependent on the initial request, whether the target agent can respond, and whether a HITM# signal was asserted by an agent on the bus. If the HITM# signal was asserted by processor 103, then data from processor 103 is placed on the bus during the Data Transfer Phase. Memory controller 122 and/or processor 102 may then latch, or take, the data off the bus. How memory controller 122 and/or processor 102 use this data is dependent on the original request, as described in more detail below.

Processor 103, after asserting the HITM# signal, places the entire cache line onto the bus 101 in the Data Transfer Phase, step 345. This action by processor 103 is termed an "Implicit Writeback Data Transfer." The Implicit Writeback Data Transfer is performed by a processor in the Data Transfer Phase of a transaction when that processor asserts a HITM# signal during the Snoop Phase for that transaction.

Figure 4A:
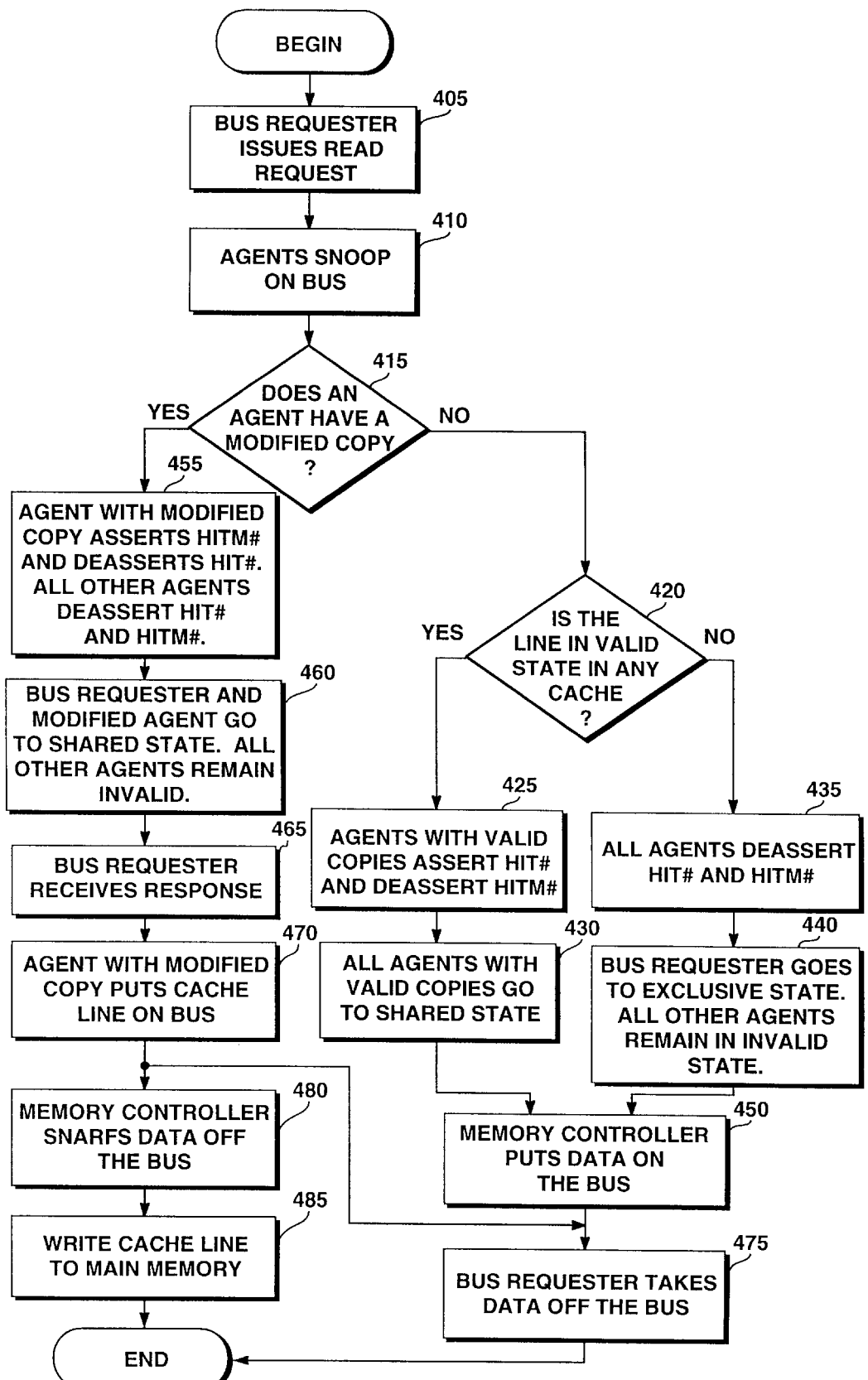
FIG. 4A is a flowchart describing the steps for performing a read operation on a pipelined bus in one embodiment of the present invention.

FIG. 4A shows a flowchart describing the steps followed by one embodiment of the present invention during a read request in the system of FIG. 1A. As described above in FIG. 3, the requesting processor, processor 102, issues a request onto bus 101 during the Request Phase, step 405. The request shown in FIG. 4A is a read request targeted to main memory 121. As above, all other agents on bus 101 perform a snoop lookup, step 410, to determine whether an agent has a copy of the requested cache line in modified state, step 415.

In the event no agent on bus 101 has a modified copy of the cache line, the steps which are followed are dependent on whether any agent has a copy of the cache line in a valid state, step 420. If an agent has a copy of the cache line in a valid state, then that agent asserts a HIT# signal and deasserts a HITM# signal, step 425. All agents without a valid copy deassert both HIT# and HITM# signals. Thus, the agents on bus 101 know that one or more agents have a valid copy of the cache line, but that no agent has a modified copy of the cache line. Therefore, each agent on bus 101 with a valid copy of the cache line changes that cache line's state to shared state, step 430. The requesting agent, processor 102 also changes its state for that cache line to shared state because processor 102 will be receiving a valid copy of the cache line in the Data Transfer Phase, as described below.

Figure 4B:
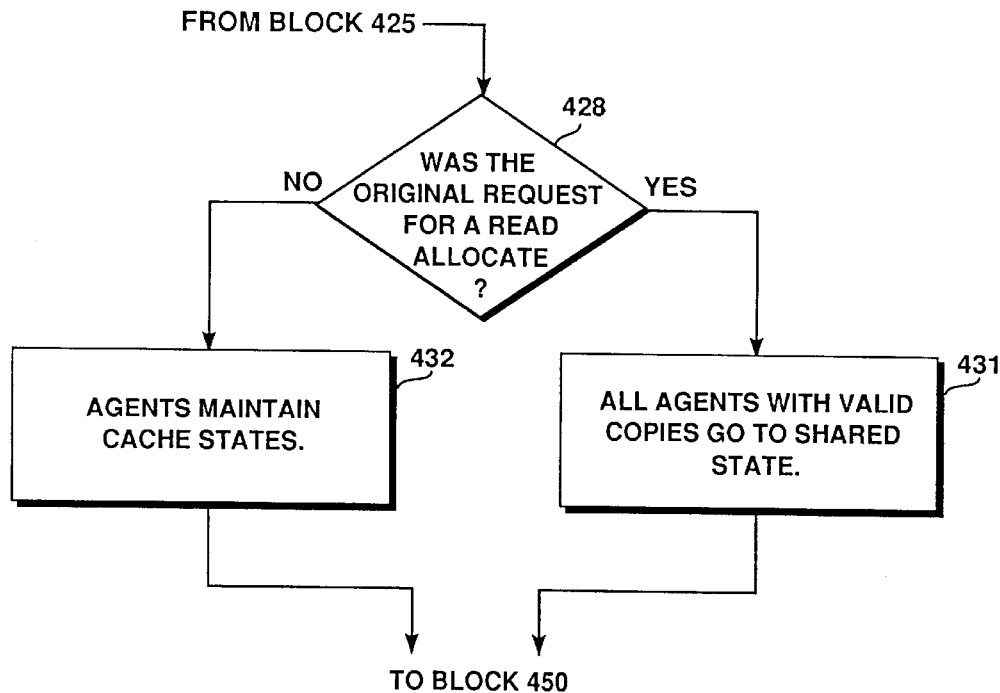
FIG. 4B is a flowchart describing the steps for updating cache states in a read operation in an alternate embodiment of the present invention.

In an alternate embodiment, shown in FIG. 4B, each agent changes state to its target state dependent on the original read request. As shown in FIG. 4B, the target state is dependent on whether the original request was a read allocate request, step 428. Processor 102 may request no read allocate, for example, to indicate it is not maintaining a copy of the cache line in its cache. If processor 102 requests read allocate, then each agent on bus 101 with a valid copy of the cache line, including processor 102, changes that cache line's state to shared state, step 431. However, if processor 102 does not request read allocate, then each agent on bus 101 maintains its cache state for that cache line, step 432. Thus, an agent in exclusive state remains in exclusive state and agents in shared state remain in shared state.

Returning to the embodiment of FIG. 4A, step 420, in the event no agent on bus 101 has a valid copy of the cache line, then all agents deassert both HIT# and HITM# signals, step 435. Thus, processor 102 changes its copy of the cache line to exclusive state because it will be receiving the cache line from memory controller 122 in the Data Transfer Phase; all other agents keep the cache line in invalid state, step 440.

Memory controller 122 satisfies the read request, regardless of whether an agent had a valid copy of the cache line, because no agent had a modified copy of the requested cache line. Memory controller 122 issues a normal response in the Response Phase to processor 102 and places the corresponding data on bus 101 during the Data Transfer Phase, step 450. Processor 102 then retrieves the data from the bus, step 475, and proceeds to utilize the data as needed.

Returning to step 415, if an agent on bus 101, such as processor 103, has a modified copy of the requested cache line, then processor 103 asserts a HITM# signal and deasserts a HIT# signal during the Snoop Phase, step 455. All other agents on the bus deassert both HIT# and HITM# signals. The assertion of the HITM# signal informs memory controller 122 that another agent on bus 101 has the most recent version of the requested data. Thus, memory controller 122 knows that it should not transfer its version of the requested cache line to processor 102.

The cache states for this cache line are also updated in both processor 102 and processor 103 in the Snoop Phase, step 460. Processor 103 transfers ownership of the cache line to the requesting processor, processor 102. In one mode, both processor 102 and processor 103 to change their cache line states to shared state and ensure main memory 121 updates its version of the cache line. One embodiment of the present invention follows this approach, step 460, due to its efficient handling of partial write data transfers, discussed in more detail below. In an alternate mode, processor 103 could transfer the cache line to processor 102 and change its cache line to invalid state while processor 102 changes its cache line to modified or exclusive state.

Thus, when both processor 102 and 103 change their cache line states to shared state, in the Snoop Phase for subsequent transactions on bus 101 neither processor 102 nor processor 103 asserts a HITM# signal for this cache line. Memory controller 121 has the responsibility of responding to any subsequent requests for this cache line (until some other caching agent regains ownership of the cache line and changes its cache line state to modified state).

Figure 4C:
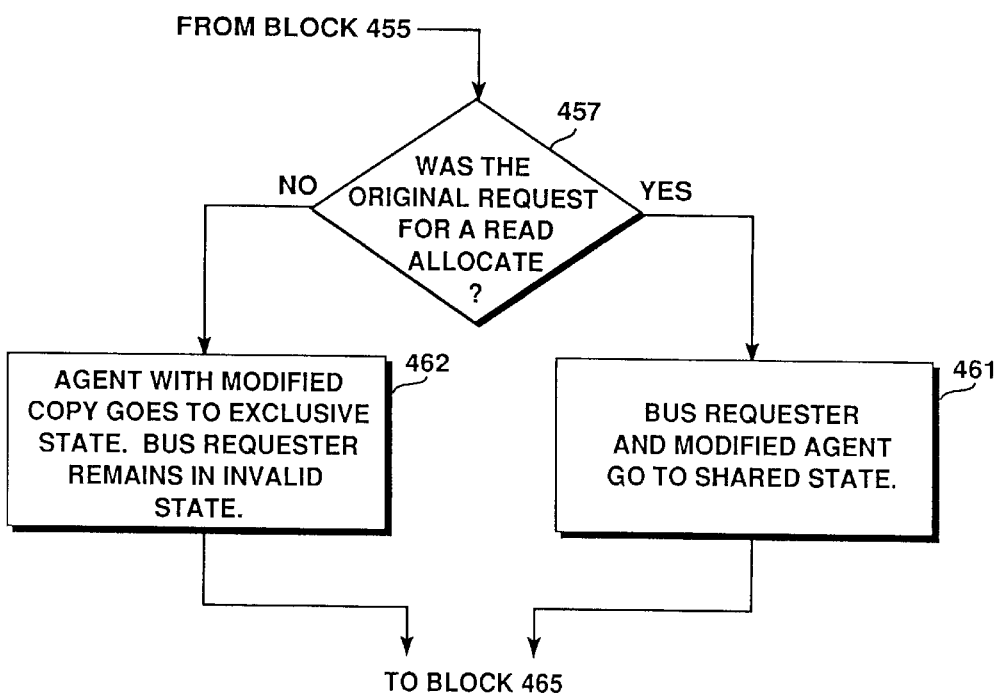
FIG. 4C is a flowchart describing the steps for updating cache states in a read operation in another embodiment of the present invention.

In an alternate embodiment, shown in FIG. 4C, each agent updates its cache state dependent on the original read request. As shown in FIG. 4C, the target state is dependent on whether the original request was a read allocate request, step 457. If processor 102 requests a read allocate, then the agent with a modified copy of the cache line changes that cache line's state to shared state and processor 102 changes its cache line to shared state, step 461. However, if processor 102 does not request a read allocate, then the agent with a modified copy of the cache line changes that cache line to exclusive state and processor 102 remains in invalid state, step 462. The agent with a modified copy of the cache line does not remain in invalid state because main memory will receive a copy of the cache line, as described below.

Returning to the embodiment of FIG. 4A, it should be understood by those skilled in the art that although ownership of a cache line is transferred prior to the actual transfer of the cache line's data, cache consistency is maintained due to the pipelined nature of the bus. That is, a subsequent request may be informed that the data will come from main memory 121 even though the modified version is still in the cache of processor 103. However, by the time the Data Transfer Phase for the subsequent request arrives the data will have already been transferred to main memory 121 in the Data Transfer Phase of a prior transaction.

After the cache states are updated, memory controller 122 issues an Implicit Writeback Response to processor 102, step 465, in the Response Phase. The assertion of the HITM# signal by processor 103 informed memory controller 122 that it should not transfer its version of the cache line to processor 102; thus, memory controller 122 issues an Implicit Writeback Response rather than a normal response. The Implicit Writeback Response informs processor 102 that the request has not been retried, but that another agent on bus 101 has a modified copy of the requested cache line and will be responding with the requested data.

Processor 103 places the entire modified cache line on bus 101 in the Data Transfer Phase, step 470. In one embodiment of the present invention, processor 103 places the cache line onto the bus in response to a signal from memory controller 122 indicating it is ready for a data transfer. Memory controller 122 issues this signal during the response phase when it has an available cache line buffer in which to place the cache line. As shown in FIG. 4A, both memory controller 122 and the requesting agent take the data off the bus, steps 480 and 475 respectively. Requesting processor 102 takes the data off the bus, step 475, and proceeds to use it as needed.

Memory controller 122 also takes the data off the bus, step 480. This action by the memory controller is termed "snarfing" the data because memory controller 122 is taking data off the bus which was requested by another agent. Memory controller 122 then writes the data to main memory 121, step 485, thereby maintaining cache consistency. That is, as described above, when processor 102 requests data which is in modified state in processor 103, processor 103 transfers the data to processor 102 and both change their cache lines to shared state. Shared state, however, requires that main memory 121 also has the most recent version of the cache line. Thus, by snarfing the cache line and writing it to main memory, both processors and main memory have the most recent copy of the cache line.

It should be noted that in the discussion above the data transfers are discussed with reference to FIG. 1A and memory controller 122. In a multiple-bus hierarchy, as shown in FIG. 1B, the cluster manager 157 acts as the memory controller 122 on the bus for purposes of the discussion related to FIG. 4A. For example, cluster manager 157 snarfs the data off the bus and updates its cache rather than memory controller 122 snarfing the data. In the system of FIG. 1B, the situation could arise where the requested read data is not available within the cluster 151. In such a situation, cluster manager 157 either defers or retries the request, depending on whether ownership of the next level bus 158 is available. In this situation, the global observation of the transaction which would have occurred at step 440, as well as the placing of data on the bus step 450, is deferred as discussed above.

Figure 5A:
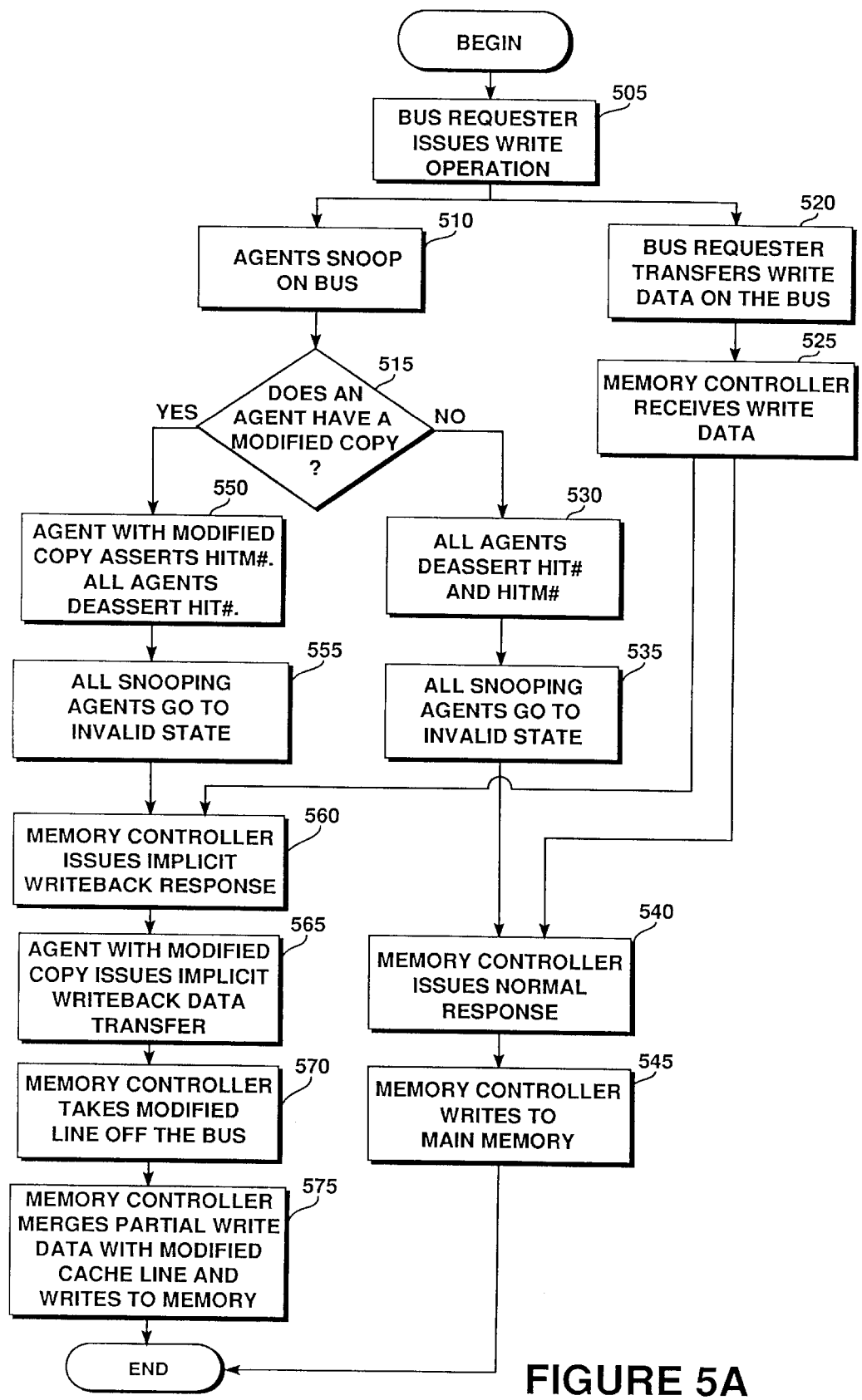
FIG. 5A is a flowchart describing the steps for performing a write operation on a pipelined bus in one embodiment of the present invention.

FIG. 5A shows a flowchart describing the steps followed by one embodiment of the present invention during a write operation in the system of FIG. 1A. As described above in FIG. 3, the requesting processor, processor 102, issues a request onto bus 101 during the Request Phase, step 505. The request shown in FIG. 5A is a write operation targeted to main memory 121. As above, all other agents on bus 101 perform a snoop lookup, step 510, to determine whether an agent has a copy of the cache line being written to in modified state, step 515.

In addition to agents performing a snoop lookup, processor 102 places its write data onto bus 101, step 520; the write data is received by memory controller 122, step 525. As shown in FIG. 5A, this transfer of write data by the requesting processor occurs regardless of whether an agent on the bus has a modified or valid copy of the cache line. In one embodiment of the present invention processor 102 places the write data onto the bus upon receipt of a signal from memory controller 122 in the Snoop Phase indicating the memory controller is ready for a data transfer.

In the event no agent on bus 101 has a modified copy of the cache line, all agents on bus 101 deassert both HIT# and HITM# signals, step 530. The existence of the write operation indicates to all snooping agents that their copy of the cache line must be invalidated; thus, all snooping agents change the state of their cache line to invalid, step 535. The deassertion of the HIT# and HITM# signals indicates to memory controller 122 that it must satisfy the write request, as no valid or modified copy of the cache line exists in any agent's cache. Thus, memory controller 122 issues a normal response to processor 102 in the Response Phase, step 540. Memory controller 122, which received the write data in step 525, then writes the data to main memory 121, step 545, thereby completing the write operation.

Figure 5B:
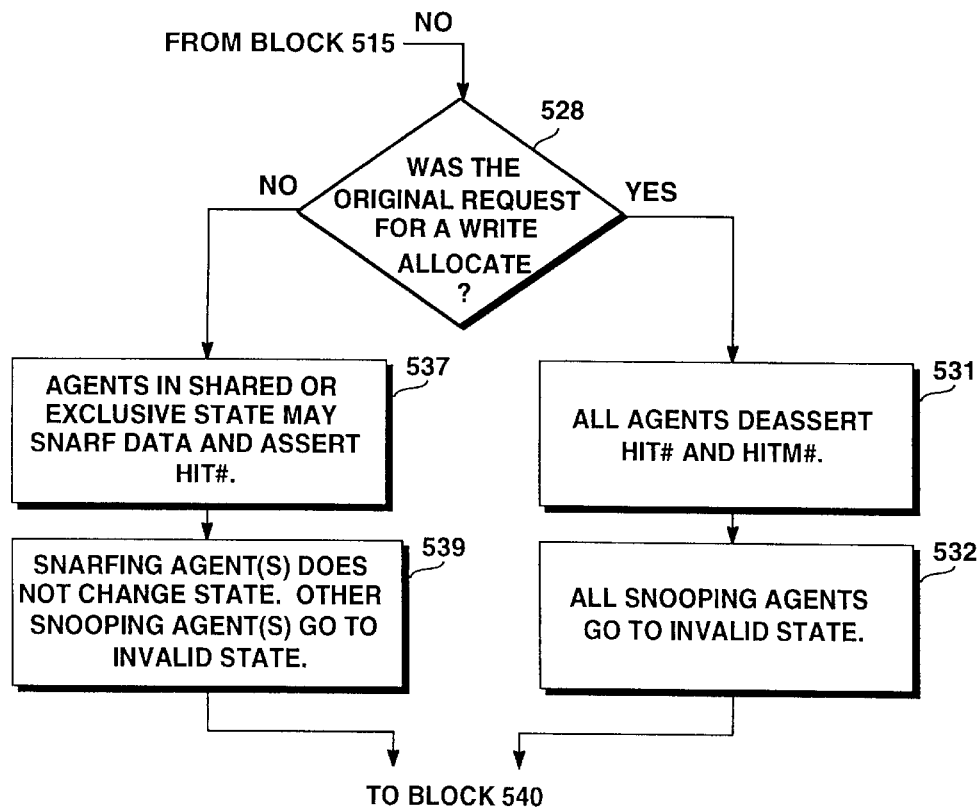
FIG. 5B is a flowchart describing the steps for updating cache states in a write operation in an alternate embodiment of the present invention.

In an alternate embodiment, shown in FIG. 5B, each agent asserts or deasserts a HIT# signal and updates its cache state dependent on the original write request, step 528. If processor 102 requests a write allocate, then all agents deassert HIT# and HITM#, step 531. All snooping agents also change the state of their cache line to invalid, step 532. However, if processor 102 does not request a write allocate, then an agent(s) with a shared or exclusive copy of the cache line snarfs the data, asserts a HIT# signal and deasserts a HITM# signal, step 537. The agent(s) which asserted a HIT# signal does not change that cache line's state; all other agents on bus 101 go to invalid state, step 539. In one mode, the agent(s) does not snarf the data and assert a HIT# signal if it does not want a valid copy of the cache line.

Returning to the embodiment of FIG. 5A, step 515, if an agent on bus 101, such as processor 103 has a modified copy of the requested cache line, then processor 103 asserts a HITM# signal and deasserts a HIT# signal during the Snoop Phase, step 550. Since processor 103 had a modified copy of the cache line, all other agents on bus 101 also deassert a HIT# signal. The assertion of a HITM# signal informs memory controller 122 that another agent on the bus 101 has the most recent version of the requested data. Thus, memory controller 122 knows that merely performing the write operation by processor 103 may not maintain cache consistency.

For example, if the write operation by processor 102 is a partial write data transfer, then the entire cache line is not modified by this write operation. If a more recent version of the cache line exists in the cache of processor 103, portions of the cache line in processor 103 not being written to by processor 102 may have been modified by prior write operations. Thus, if the cache line in processor 103 were not taken into account, main memory 121 would have an incorrect copy of the data, even though it believes it has the most recent copy.

As discussed above, the states of this cache line are updated in the Snoop Phase. All snooping agents on bus 555 change their cache lines to invalid state, step 555.

Memory controller 122 observed the HITM# signal issued by processor 103 in step 550; thus, memory controller 122 knows that a modified version of the cache line exists in an agent's cache. In response, memory controller 122 temporarily stores the write data received in step 525 in a snarfing buffer and holds the data in the snarfing buffer until the remainder of the cache line is transferred over the bus, as described below. In addition, memory controller 122 issues an Implicit Writeback Response to processor 102, step 560. The Implicit Writeback Response informs processor 102 that another agent on the bus had a modified copy of the cache line and that this modified cache line will be placed on bus 101 during the Data Transfer Phase.

Figure 5C:
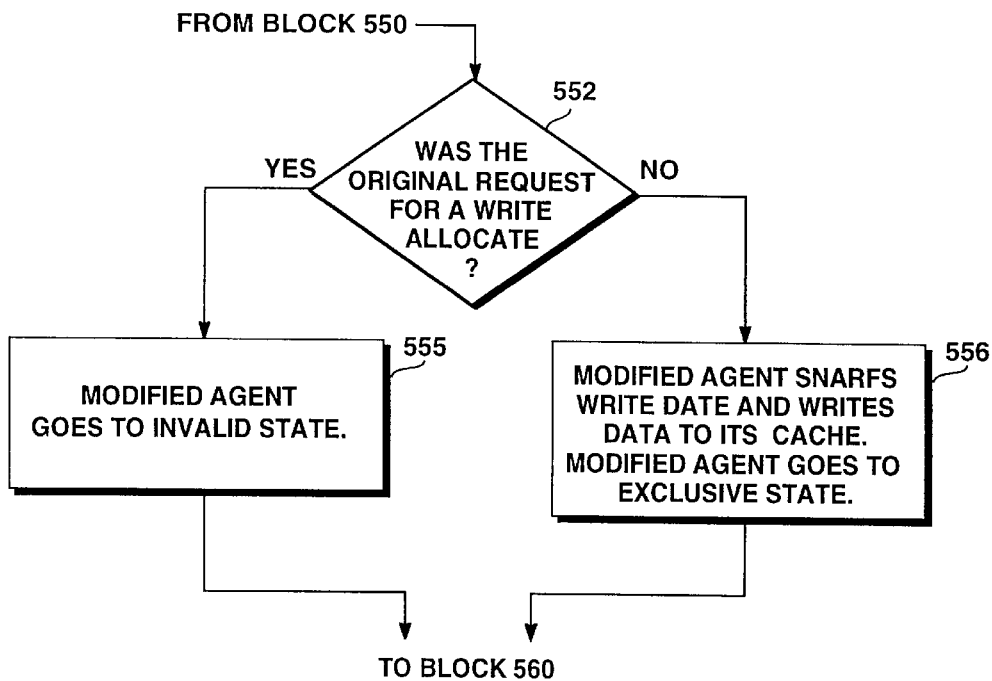
FIG. 5C is a flowchart describing the steps for updating cache states in a write operation in another embodiment of the present invention.

In an alternate embodiment, shown in FIG. 5C, the agent which asserted the HITM# signal, processor 103, may also take the write data off the bus. Whether processor 103 takes the data off the bus is dependent on the write allocate policy employed, step 552. That is, if processor 102 requests no write allocate then processor 103 takes the data off the bus and writes the data to its cache, step 556. Processor 103 also changes its state for the cache line to exclusive. However, if processor 102 requests a write allocate, then processor 103 does not take the data off the bus and changes its cache line to invalid state, step 555.

Returning to the embodiment of FIG. 5A, main memory 121 maintains the most recent version of the cache line. This is done so that main memory is updated rather than continuously updating the agent caches.

Thus, in the Data Transfer Phase, processor 103 places the entire modified cache line on the bus, step 565. This data transfer is the Implicit Writeback Data Transfer. The Implicit Writeback Data Transfer must be done in order to provide memory controller 122 with the additional portion of the cache line which may not have been written to by processor 102. In one embodiment of the present invention, processor 103 places the cache line onto the bus in response to a second signal from memory controller 122 indicating it is ready for a data transfer. Memory controller 122 issues this signal in the Response Phase when it has an available cache line buffer in which to place the cache line.

Memory controller 122 takes the modified cache line from the Implicit Writeback Data Transfer off the bus, step 570. In one mode, this data is temporarily stored in a cache line buffer within memory controller 122. The data is then merged with the data stored in the snarfing buffer, described above, and the merged cache line is written to main memory 121, step 575. To perform the merge, memory controller 122 combines the portion of the cache line in the snarfing buffer with the data received from the Implicit Writeback Data Transfer that does not overlap the updated portion in the snarfing buffer.

It should be noted that although the above discussion refers to partial write data transfers, the steps employed apply equally to a non-partial write data transfer. That is, if the entire cache line was updated by a write operation from processor 102, then the entire cache line would be stored in the snarfing buffer in memory controller 122. Subsequently, when memory controller 122 performs the merge in step 565, the result of the merge would simply be the data stored in the snarfing buffer; no data from the Implicit Writeback Data Transfer would be used in the merge.

In one embodiment the requesting processor, processor 102, changes its state for the cache line to invalid state in the Snoop Phase. In an alternate embodiment, processor 102 changes its state for the cache line to shared state or exclusive state, depending on whether another agent also has a copy of the cache line. In one mode, if a HITM# signal was asserted during the Snoop Phase, then processor 102 snarfs the Implicit Writeback Data from the bus. Processor 102 then merges this data with its original write data, and updates its cache with the merged cache line. Thus, processor 102 would change its state for the cache line to exclusive state. In another mode, if no HITM# signal was asserted then processor 102 changes its cache line state to exclusive state, or shared state if other agents on the bus are keeping valid copies of the cache line.

It should also be noted that in the discussion above the data transfers are discussed with reference to FIG. 1A and memory controller 122. As discussed above with reference to FIG. 4A, in a multiple-bus hierarchy as shown in FIG. 1B the cluster manager 157 acts as the memory controller 122 on the bus for purposes of the discussion related to FIG. 5A. For example, cluster manager 157 receives the write data from processor 102, merges it with the Implicit Writeback Data Transfer from processor 103, and stores the merged cache line in its own cache. Thus, cluster manager 157 would have a modified copy of the cache line for any subsequent requests to that cache line. In the system of FIG. 1B, the situation could arise where the cache line processor 102 is writing to is invalid within cluster 151 and access must be made to the next level bus 158. In such a situation, cluster manager 157 either defers or retries the request, depending on whether ownership of the next level bus 158 is available. In this situation, the global observation of the transaction which would have occurred at step 535, as well as the write step 545, is deferred as discussed above.

As shown in FIGS. 3–5A, the snooping agent which has a modified copy of the requested cache line behaves similarly whether the request is a read request or a write request. That is, the snooping agent asserts a HITM# signal, deasserts a HIT# signal, and places the referenced cache line onto the bus at the appropriate time. Thus, due to this similarity, one embodiment of the present invention manages write data transfers, partial write data transfers and read requests with a minimal amount of logic complexity in every agent.

Figure 6:
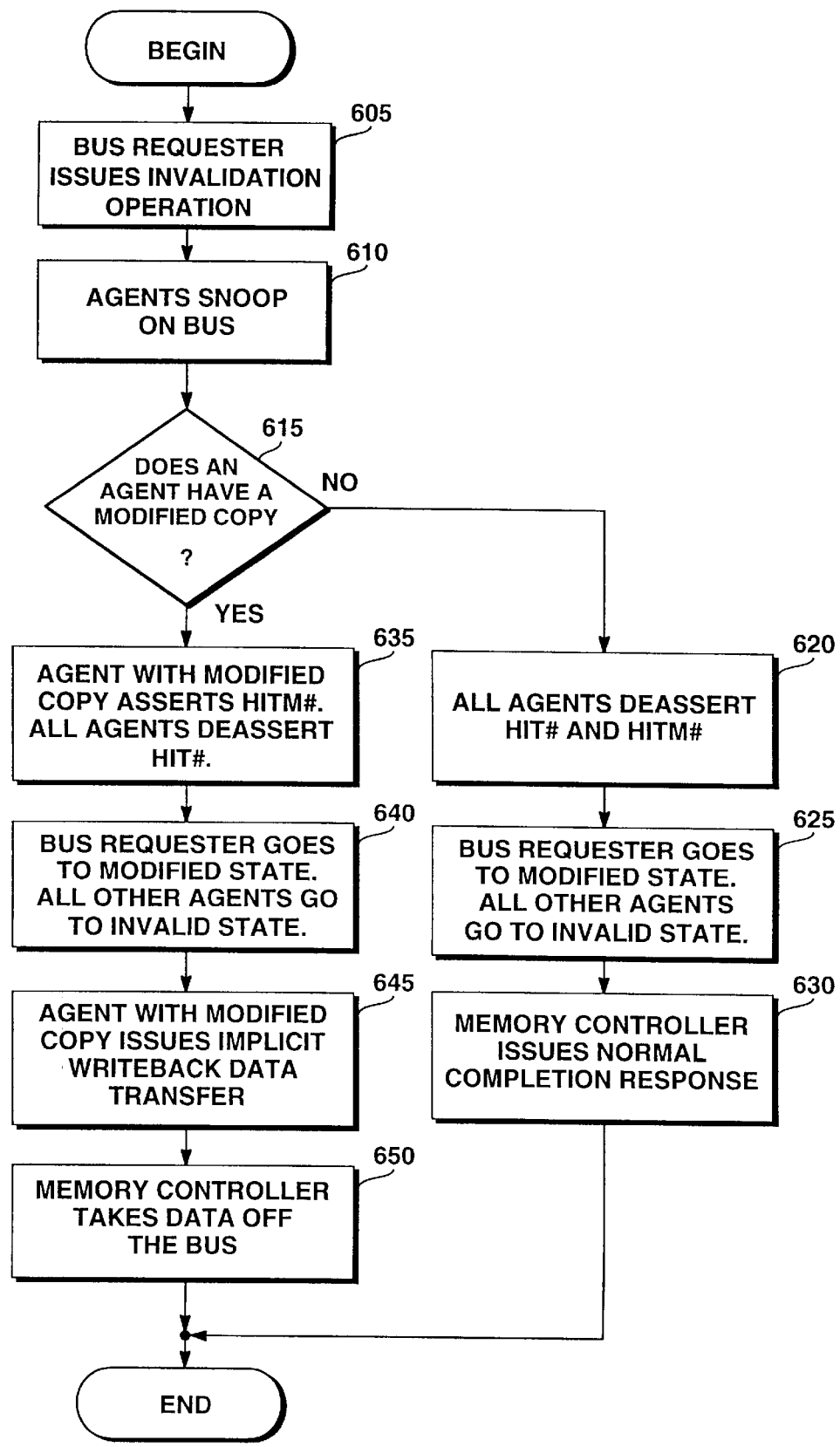
FIG. 6 is a flowchart describing the steps for performing a cache line invalidation operation on a pipelined bus in one embodiment of the present invention.

FIG. 6 shows a flowchart describing the steps followed by one embodiment of the present invention during an invalidate cache line request in the system of FIG. 1A. As described above in FIG. 3, the requesting agent, such as processor 102, issues a request onto the bus 101 during the Request Phase step 605. The request shown in FIG. 6 is an invalidation request for a cache line. That is, processor 102 is issuing a request to invalidate a particular cache line in every other cache. This might be done, for example, if processor 102 has a copy of the cache line in its cache in shared state and desires to write to it; processor 102 could invalidate all other cache lines and then update its cache state to modified and write to the cache line in its own cache.

As above, all other agents on bus 101 do a snoop lookup, step 610, to determine whether one has a copy of the cache line in modified state, step 615. In the event no agent on bus 101 has a modified copy of the cache line, each agent deasserts HIT# and HITM# signals, step 620. The invalidation request then proceeds with each agent on bus 101, except processor 102, invalidating its copy of the cache line and cache line ownership going to processor 102 (that is, the cache line in processor 102 is changed to modified state), step 625. Memory controller 122 then issues a normal completion response to processor 102, step 630, and processing continues.

However, if an agent on bus 101, such as processor 103, has a modified copy of the requested cache line, then processor 103 asserts a HITM# signal and deasserts a HIT# signal during the Snoop Phase, step 635. All other agents on the bus also deassert a HIT# signal during the Snoop Phase. The assertion of the HITM# signal informs processor 102 that another agent on bus 101 has current ownership of the cache line. Thus, ownership of the cache line must be transferred.

As above, the internal cache states of the processors are modified in the Snoop Phase. Thus, the cache line in processor 102 is changed to modified state and the cache line in processor 103 is changed to invalid state, step 640. Therefore, in step 640 processor 102 obtains ownership of the cache line even though the actual data has not been transferred yet.

The updating of cache states in the Snoop Phase guarantees that modified data is not lost. Thus, if the next request on bus 101 is an access to the same cache line, processor 102 asserts a HITM# signal because it has ownership of the cache line. By the time data transfer must occur for this next request, processor 102 will have the most recent version of the cache line in its cache, as discussed above.

In the Data Transfer Phase, processor 103 issues an Implicit Writeback Data Transfer of the cache line, step 645. This transfer is the entire cache line being transferred to processor 102. In one embodiment of the present invention, processor 103 places the cache line onto the bus in response to a signal from memory controller 122 indicating it is ready for a data transfer. Memory controller 122 issues this signal during the response phase when it has an available cache line buffer in which to place the cache line. Processor 102 takes the data off the bus, and memory controller 122 snarfs the data off the bus, step 650. Thus, the cache line in processor 102 is now in modified state and main memory 121 also has the most recent version of the modified cache line. Alternatively, processor 102 could change its cache state to exclusive state since main memory 121 also has a valid copy.

It should also be noted that in the discussion above the data transfers are discussed with reference to FIG. 1A and memory controller 122. As discussed above with reference to FIGS. 4 and 5, in a multiple-bus hierarchy as shown in FIG. 1B the cluster manager 157 acts as the memory controller 122 on the bus for purposes of the discussion related to FIG. 6. For example, cluster manager 157 takes the data off the bus in step 650. In the system of FIG. 1B, in order to invalidate a cache line, the cache line for all caches in all clusters is invalidated. Thus, the situation could arise where the cache line being invalidated is also contained within cluster 151 and access must be made to the next level bus 158 in order to invalidate it. In such a situation, cluster manager 157 either defers or retries the request, depending on whether ownership of the next level bus 158 is available. In this situation, the global observation of the transaction, which would have occurred at step 625, is deferred as discussed above.

In an alternate embodiment of the present invention, the snooping agent (i.e., the agent which has a modified copy of the requested cache line), processor 103, merges the data rather than memory controller 122. In the event of a partial write data transfer, processor 103 takes the partial write data off the bus. Processor 103 then transfers the cache line from its own cache into a temporary storage buffer and merges the cache line with the partial write data. Thus, processor 103 maintains a modified copy of the cache line and alleviates memory controller 122 of the data merge responsibility.

Upon completion of the merge, processor 103 has two options: the cache for processor 103 may be updated or the cache line may be written to main memory 121. If processor 103 updates the cache, one embodiment entails continuously updating the temporary buffer and writing the buffer contents to cache memory only on a miss to the temporary buffer. Thus, processor 103 efficiently responds to multiple requests for the same cache line.

In the second option, processor 103 updates main memory 121. Thus, upon completion of the merge operation processor 103 transfers the cache line over bus 101 to main memory 121. This transfer is a separate transaction, and thus is accomplished by arbitrating for the bus 101 and issuing a write to memory request in the Request Phase when granted access to bus 101.

Thus, it can be seen that according to the present invention, cache consistency is maintained in a pipelined bus system. In one embodiment, memory accesses are satisfied in a single transaction, regardless of whether the data accessed is contained in a main memory unit of the bus or a cache memory within an agent on the bus.

It should be understood by those skilled in the art that although the particular embodiments shown above discuss read, write and invalidate operations, the present invention is not limited to these operations. Other operations which may be issued over the bus are also within the scope and spirit of the present invention.

Whereas many alterations and modifications of the present invention will no doubt be comprehended a person skilled in the art after having read the foregoing description, it is to be understood that the particular embodiments shown and described by way of illustration are in no way intended to be considered limiting. Therefore, references to details of the particular embodiments are not intended to limit the scope of the claims which in themselves recite only those features regarded as essential to the invention.

Thus, a method and apparatus for supporting read, write, and invalidation operations to memory which maintain cache consistency have been described.

What is claimed is:

1. A method of operating a computer system which includes a bus coupled to a requesting agent, a snooping agent, and a memory unit, said method comprising:

issuing a write request as part of a pipelined transaction by said requesting agent, said write request having a target agent;

snooping on said bus by said snooping agent to determine whether said write request corresponds to modified cache data in a cache memory of said snooping agent;

issuing a signal from said snooping agent to said requesting agent indicating said write request corresponds to said modified cache data in said cache memory;

placing data corresponding to said write request on said bus by said requesting agent; and placing said modified cache data from said cache memory onto said bus by said snooping agent during said pipelined transaction.

2. The method of claim 1 further comprising taking said data from said requesting agent off said bus by said memory unit and said snooping agent.

3. The method of claim 1 further comprising:

taking said modified cache data off said bus by said memory unit;

creating an updated data unit by merging said data corresponding to said write request and said modified cache data; and storing said updated data unit in said memory unit.

4. The method of claim 1 wherein said write request is a write to a portion of said modified cache data.

5. An apparatus for maintaining cache consistency which can be coupled to a pipelined bus, said bus having a requesting agent and a snooping agent coupled thereto, said apparatus comprising:

means for,
      receiving first data associated with a request from said bus in a first phase of a pipelined bus transaction,
      storing said first data in a first location,
      receiving second data from said bus associated with said request in a second phase of said pipelined bus transaction, and
      storing said second data in a second location; and means for creating an updated data unit by merging said first data and said second data together.

6. The apparatus of claim 5 further comprising means for storing said updated data unit.

7. An apparatus for maintaining cache consistency which can be coupled to a pipelined bus, said bus having a requesting agent and a snooping agent coupled thereto, said apparatus comprising:

a memory; and a memory controller coupled to said memory and said bus for,
      receiving and storing first data associated with a request from said requesting agent during a first phase of a pipelined bus transaction,
      receiving and storing second data from said bus from said snooping agent during a subsequent phase of said pipelined bus transaction, and
      merging said first data and said second data together.

8. The apparatus of claim 7 wherein said memory controller is also for forming an updated memory unit by merging said first data and said second data together, and storing said updated memory unit in said memory.

9. The apparatus of claim 7 wherein said memory controller comprises:

a first buffer for storing said first data;

a second buffer for storing said second data; and a first circuit for merging said first data and said second data.

10. The apparatus of claim 7 wherein said memory controller is also for issuing a response to said requesting agent.

11. The apparatus of claim 8 wherein said updated memory unit is a cache line corresponding to said first data.

12. An apparatus for maintaining cache consistency that can be coupled to a pipelined bus, the pipelined bus having a requesting agent and a snooping agent coupled thereto, the apparatus comprising:

a memory; and a memory controller, coupled to both the memory and the pipelined bus, to,
      receive and store first data associated with a request from the requesting agent during a first phase of a pipelined bus transaction,
      receive and store second data from the pipelined bus from the snooping agent during a subsequent phase of the pipelined bus transaction, and
      merge the first data and the second data together.

13. The apparatus of claim 12 wherein the memory controller is also to form an updated memory unit by merging the first data and the second data together, and store the updated memory unit in the memory.

14. The apparatus of claim 12 wherein the memory controller is also to issue a response to the requesting agent.

15. The apparatus of claim 13 wherein the updated memory unit is a cache line corresponding to the first data.

16. A computer system comprising:
a bus;
a memory unit coupled to the bus;
a requesting agent coupled to the bus, the requesting agent to,
   issue a write request as part of a pipelined transaction, the write request having a target agent, and
   place data corresponding to the write request on the bus; and
a snooping agent, coupled to the bus and having a cache memory, the snooping agent to,
   snoop the bus and determine whether the write request corresponds to modified cache data in the cache memory,
   issue a signal to the requesting agent indicating that the write request corresponds to the modified cache data in the cache memory, and
   place the modified cache data from the cache memory onto the bus during the pipelined transaction.

17. The computer system of claim 16 wherein the memory unit is to take the modified cache data off the bus, merge the data corresponding to the write request and the modified cache data to create an updated data unit, and store the updated data unit in the memory unit.

18. The computer system of claim 16 wherein the write request is a write to a portion of the modified cache data in the cache memory.

19. A computer system comprising;
a bus;
a plurality of agents coupled to the bus, the plurality of agents including a requesting agent and a snooping agent;
a digital signal processor coupled to the bus;
a memory; and
a memory controller, coupled to both the memory and the bus, to,
   receive and store first data associated with a request from the requesting agent during a first phase of a pipelined bus transaction,
   receive and store second data from the bus from the snooping agent during a subsequent phase of the pipelined bus transaction, and
   merge the first data and the second data together.

20. A computer system comprising:
a bus;
a digital signal processor coupled to the bus;
a memory unit coupled to the bus;
a requesting agent coupled to the bus, the requesting agent to,
   issue a write request as part of a pipelined transaction, the write request having a target agent, and
   place data corresponding to the write request on the bus; and
a snooping agent, coupled to the bus and having a cache memory, the snooping agent to,
   snoop the bus and determine whether the write request corresponds to modified cache data in the cache memory,
   issue a signal to the requesting agent indicating that the write request corresponds to the modified cache data in the cache memory, and
   place the modified cache data from the cache memory onto the bus during the pipelined transaction.

21. A computer system comprising:
a bus;
a plurality of agents, coupled to the bus, including a requesting agent having a first cache memory and a snooping agent having a second cache memory;
a digital signal processor coupled to the bus;
a memory unit coupled to the bus;
wherein the requesting agent is to issue a request on the bus as part of a pipelined transaction, the request having a target agent;
wherein the snooping agent is to,
   snoop on the bus in a first phase of the pipelined transaction to determine whether data corresponding to the request is contained in a cache line of the second cache memory,
   issue one of either a first signal or a second signal and place data to satisfy the request from the second cache memory onto the bus in a second phase of the pipelined transaction, wherein the first signal indicates that the data is contained in the second cache memory in a modified state, and the second signal indicates that the data is contained in the second cache memory in an unmodified state, and
   update a state of the cache line of the second cache memory based on which of the first signal and the second signal is issued; and
wherein the requesting agent is also to update a state of a cache line of the first cache memory corresponding to the data based on which of the first signal and the second signal is issued.

22. A computer system comprising:
a bus;
a plurality of agents coupled to the bus, the plurality of agents including a requesting agent and a snooping agent;
a storage device controller, coupled to the bus, to control data transfers to and from a removable magnetic storage device;
a memory; and
a memory controller, coupled to both the memory and the bus, to,
   receive and store first data associated with a request from the requesting agent during a first phase of a pipelined bus transaction,
   receive and store second data from the bus from the snooping agent during a subsequent phase of the pipelined bus transaction, and
   merge the first data and the second data together.

23. A computer system comprising:
a bus;
a storage device controller, coupled to the bus, to control data transfers to and from a removable magnetic storage device;
a memory unit coupled to the bus;
a requesting agent coupled to the bus, the requesting agent to,
   issue a write request as part of a pipelined transaction, the write request having a target agent, and
   place data corresponding to the write request on the bus; and a snooping agent, coupled to the bus and having a cache memory, the snooping agent to,
   snoop the bus and determine whether the write request corresponds to modified cache data in the cache memory,
   issue a signal to the requesting agent indicating that the write request corresponds to the modified cache data in the cache memory, and
   place the modified cache data from the cache memory onto the bus during the pipelined transaction.

24. A computer system comprising:

a bus;

a plurality of agents, coupled to the bus, including a requesting agent having a first cache memory and a snooping agent having a second cache memory;

a storage device controller, coupled to the bus, to control data transfers to and from a removable magnetic storage device;

a memory unit coupled to the bus;

wherein the requesting agent is to issue a request on the bus as part of a pipelined transaction, the request having a target agent;

wherein the snooping agent is to,
   snoop on the bus in a first phase of the pipelined transaction to determine whether data corresponding to the request is contained in a cache line of the second cache memory,
   issue one of either a first signal or a second signal and place data to satisfy the request from the second cache memory onto the bus in a second phase of the pipelined transaction, wherein the first signal indicates that the data is contained in the second cache memory in a modified state, and the second signal indicates that the data is contained in the second cache memory in an unmodified state, and
   update a state of the cache line of the second cache memory based on which of the first signal and the second signal is issued; and wherein the requesting agent is also to update a state of a cache line of the first cache memory corresponding to the data based on which of the first signal and the second signal is issued.

* * * * *

UNITED STATES PATENT AND TRADEMARK OFFICE
CERTIFICATE OF CORRECTION

PATENT NO.   : 5,909,699
DATED        : June 1, 1999
INVENTOR(S)  : Sarangdhar et al.

It is certified that error appears in the above-identified patent and that said Letters Patent is hereby corrected as shown below:

<u>Title page,</u>
Item [56], OTHER PUBLICATIONS,
*Attorney, Agent, or Firm,* please delete "Seth Kalson" and replace with -- Blakely Sokoloff Taylor & Zafman --.

Signed and Sealed this

Thirteenth Day of August, 2002

*Attest:*

*Attesting Officer*

JAMES E. ROGAN
*Director of the United States Patent and Trademark Office*